Figure 1:
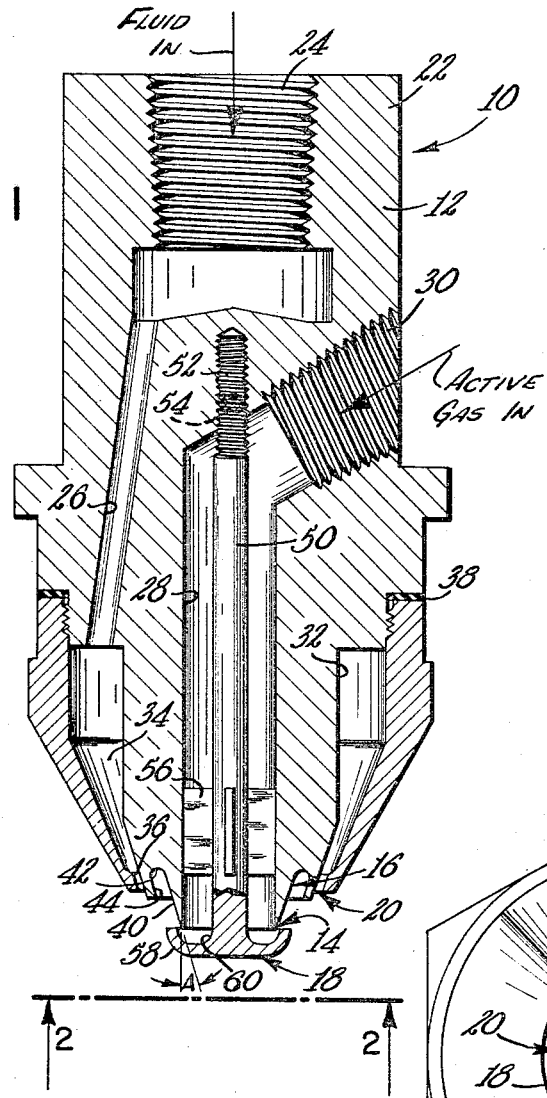
Figure 9:
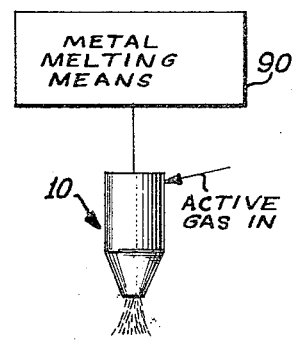
Figure 2:
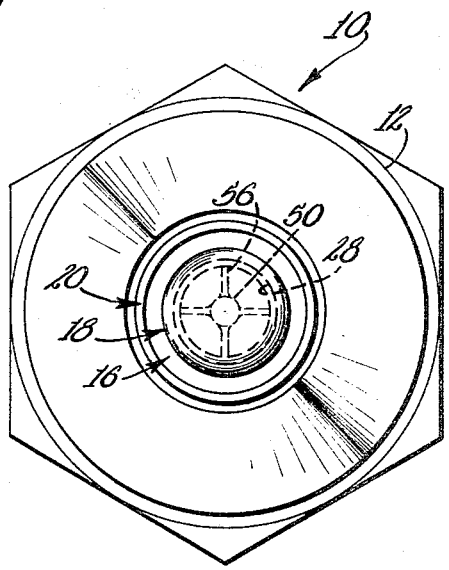
Figure 3:
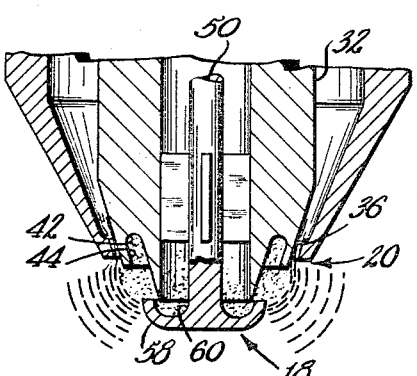
Figure 4:
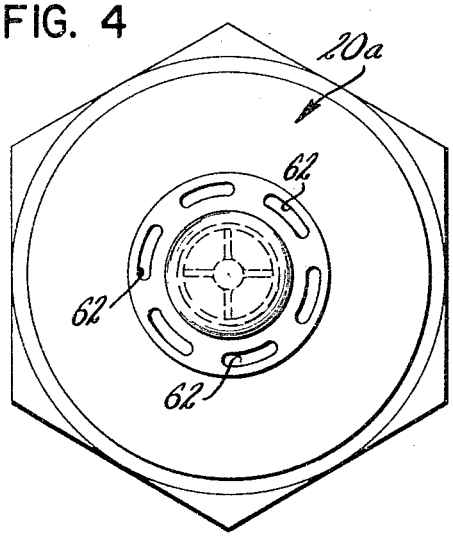
Figure 5:
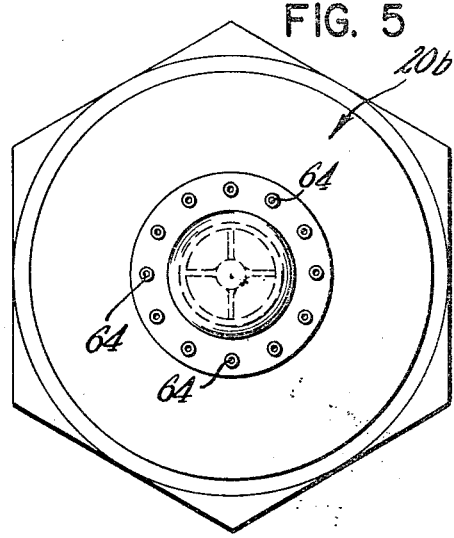
Figure 6:
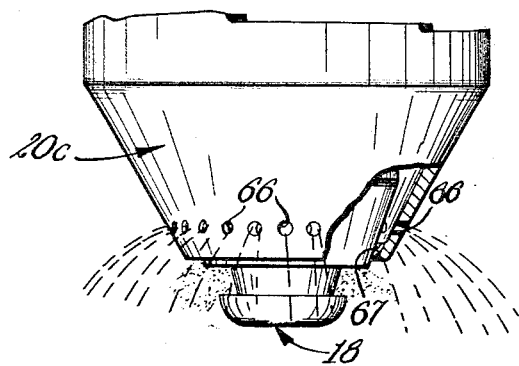
Figure 7:
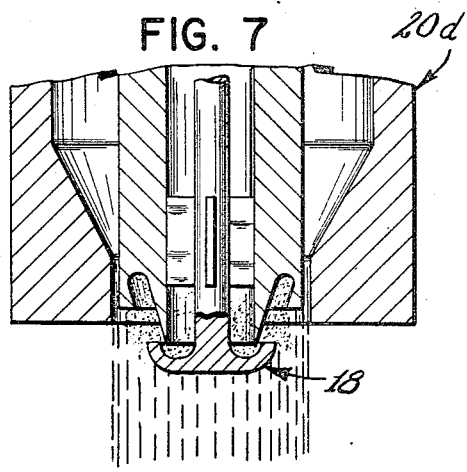
Figure 8:
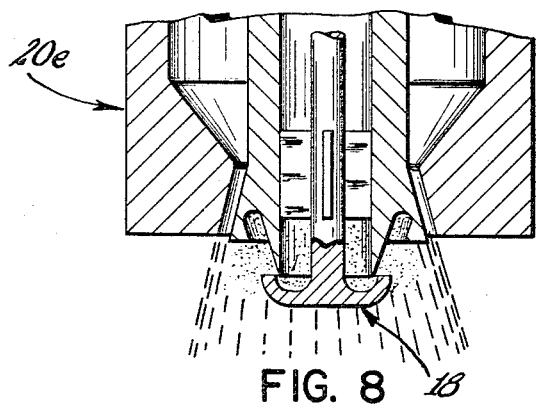
Figure 10:
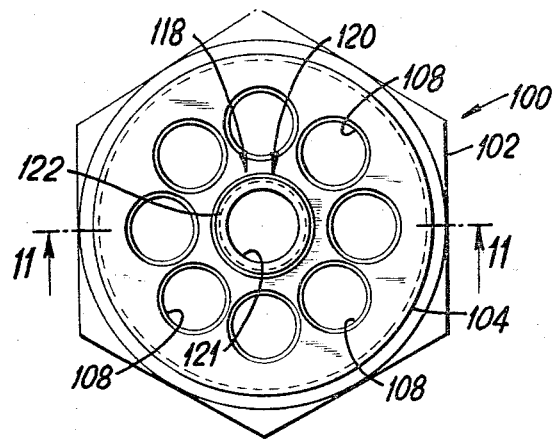
Figure 11:
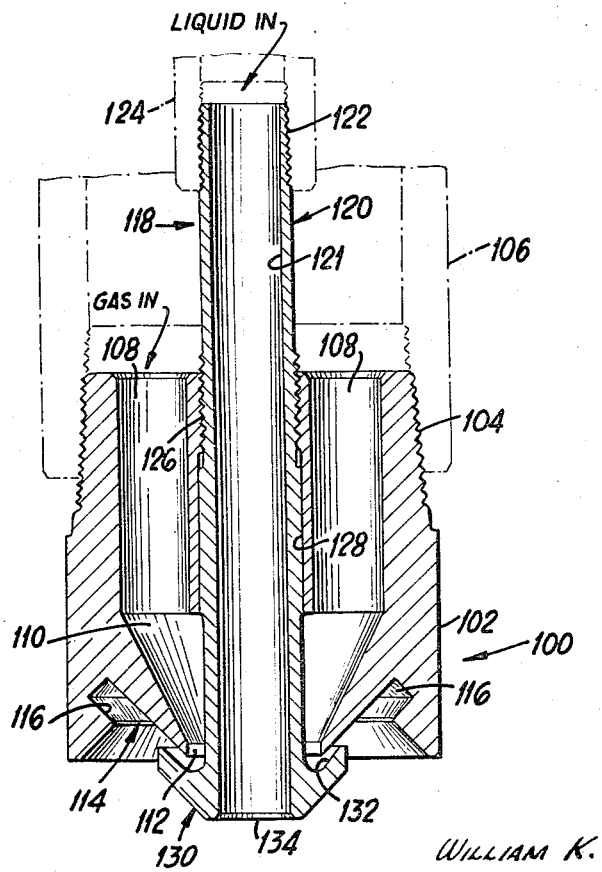

Jan. 10, 1967 W. K. FORTMAN 3,297,255
REVERSE FLOW ACOUSTIC GENERATOR SPRAY NOZZLE
Filed April 19, 1965 3 Sheets-Sheet 1

INVENTOR.
WILLIAM K. FORTMAN
BY
Leonard H. King
ATTORNEY

INVENTOR.
WILLIAM K. FORTMAN
BY
Leonard H. King
ATTORNEY

INVENTOR.
WILLIAM K. FORTMAN
BY
Leonard H. King
ATTORNEY.

United States Patent Office 3,297,255
Patented Jan. 10, 1967

3,297,255
REVERSE FLOW ACOUSTIC GENERATOR
SPRAY NOZZLE
William K. Fortman, Essex, Conn., assignor to
Astrosonics, Inc., Syosset, N.Y.
Filed Apr. 19, 1965, Ser. No. 449,189
15 Claims. (Cl. 239—102)

This application is a continuation-in-part of my copending application, Serial No. 288,266 for a "Reverse Flow Acoustic Generator Spray Nozzle," filed June 17, 1963.

This invention relates to high volume liquid aerosol generating devices employing acoustic generators.

As is well known in the art, for example as taught in U.S. Patent No. 2,519,619 granted to Yellott et al., a high energy vibratory sound field is produced when a tuned cavity resonator is excited into resonance under the influence of an impinging high velocity jet of gas. The resonator will periodically load and unload violently at the imposed resonator frequency. Thus the high velocity jet stream is converted or transduced into a high intensity sonic beam.

Prior art spray devices employing Yellott et al. and related Hartmann-type acoustical generators, have directed the liquid generally towards the resonator cup. As a result thereof, the resonator cup tended to clog particularly if viscous liquids were being handled.

Further the extended position of the resonator cup of the prior art presents an aerodynamic influence on operation of the apparatus since it is directly in the path of the sprayed materials and accordingly subject to eroding and corroding influences. The shortcomings of this arrangement may be manifested in several ways. When the spray material used is an acid, salt, molten metal, etc., there will be rapid wearing of the resonator cup necessitating frequent changes or repairs in addition to inaccurate and unpredictable operation. When thixatropic materials, such as gelatins, waste sludge, coffee syrups, liquors, etc., are sprayed, a tendency exists for coatings to build up thereby distorting the aerodynamic path and sound field, as well as disturbing the atomizing characteristics.

There is still another characteristic of the conventional opposed-resonator construction that lends itself to improvement. Heretofore, the resonator cavities have been cup-shaped, defined by a bottom wall transverse to the longitudinal axis of the generator and a cylindrical side wall parallel to the longitudinal axis of the generator. With this arrangement, there is a tendency to emit the most intense sound waves at right angles to the longitudinal axis, thus requiring the addition of a reflector to direct and concentrate the sound waves forward of the generator.

The present invention is directed towards providing a more rugged device capable of operating efficiently even with materials heretofore considered impractical because of their viscosity or corrosiveness. In the present invention, the resonator is made an integral part of the body and is contained therein. This assures a rugged, durable construction, good reflectivity and a more coherent sound field. Further, the fabrication of the device is simplified by forming the air inlet passage by a drilling operation and avoiding the use of a costly internally tapered passageway to provide a restricted orifice.

The generator of the present invention is versatile in that the resonator cavity can be angled with respect to the longitudinal central axis of the generator in accordance with or to satisfy the requirements of a particular application. The proper selection of resonator angle assumes the formation of a particular spray angle (sound emission at source) at maximum resonance. By using the construction of the present invention, air and sound by reflection and rebound reflection (air bounding off a surface) will tend to flow at right angles from the wall of a resonator resulting in an overall spray cone included angle suitable for use with many of the more difficult spraying problems.

The construction of the present invention insures a more rigidly mounted resonator which, in turn, produces better sound reflection. Since the resonator is enclosed within the body of the generator, and in fact is part of the generator body, there is a substantial mass behind it. This is in contrast with the prior art which externally supports the rsonator on a slender axial stem. Further, the improved location of the resonator makes it less subject to plugging, wear, corrosion and other deterioration which tend to shorten its effective life and impair its accuracy.

Working in cooperation with the relocated resonator is a reversing deflector. This novel means of directing the high velocity gas into the resonator cavity sets the gaseous medium into resonance. The reversing deflector of the present invention comprises in part a toroid having a concave portion spacedly opposing the gas and spray material outlets as well as the internally located resonator cavity. The concave portion of the toroid effectively reverses the gas flow and directs it into the resonator cavity wherefrom its emanates at substantially right angles to the wall of the resonator to impinge upon and break up the spray material. The shallow toroid is situated on the longitudinal axis of the generator and may be adjusted closer to or further away from the nozzle area. This provides an effective control of the exiting gas annular area. The shallowness and small size of the reversing reflector virtually eliminate any obstruction in front of the resonator and thereby overcome a major objection to the prior art generators, namely, the externally supported resonator.

In one form of the present invention, the resonator and toroid are surrounded by a cavity or reservoir for liquids which may include fluid metals, emulsions, sludges, plastics, or other viscous or nonviscous material provided it will flow. Means to discharge the sprayable material, such as an annular opening, a series of holes, orifice inserts, or slots, are positioned proximate the resonator so that either by gravity or under pressure, the sprayable material is caused to flow past the acoustically disturbed active gas stream and is broken up thereby. Thus, another major shortcoming of prior art generators is overcome in that the resonator is no longer located downstream and in the way of the sprayed material. While this is not of prime importance with the less viscous fluids, it is significant with the viscous materials such as fluid metals, gelatins, wastes, etc.

In another form of the invention, the liquid or fluid port is centrally located on the longitudinal axis of the body and both the resonator and reversing deflector are concentrically positioned thereabout. This construction with a substantialy linear central bore permits a smoother flow therethrough of particularly viscous materials to be atomized such as sludges having high solids content. A further advantage is when abrasive materials are handled, the straight through flow path avoids the wear which results from the flow of such material through the body of the embodiment of FIG. 1. In addition, the structure of this embodiment permits the positioning of the fluid outlet port downstream of both the resonator and the reversing deflector so that the likelihood of contamination is minimized.

The present invention contemplates among other things, the use of a relatively small reversing deflector and a large spray material exit area, thus preventing interference with the spray pattern. Further, the continuous D.C. blast of gas will prevent any particle from lodging in the gas outlet adjacent the reversing deflector, and as the generator is frequently used in the vertical position (nozzle downward) the material to be sprayed flows downwardly by gravity past the acoustically disturbed active gas stream where break-up will occur. Further, since the cavity opening faces downwardly, there is no tendency for materials to collect therein.

Accordingly, it is an object of the present invention to provide a more rugged acoustic generator.

It is another object of the present invention to provide an acoustic generator with a resonator substantially enclosed therein.

An additional object is to provide an acoustic generator with an annular resonator.

A further object is to associate a reversing deflector with said annular resonator.

Still another object is to construct an acoustic generator capable of accommodating some of the more viscous or corrosive fluid materials.

Another object is to provide an acoustic generator requiring less critical machining procedures.

An additional object is to provide an acoustic generator capable of generating a variety of spray cone angles.

Another object is to provide an acoustic generator that produces an improved sound reflection.

Still another object is to construct a spray device employing an acoustic generator less subject to plugging, wear, corrosion and other maltreatment.

A further object is to provide an acoustic generator with a minimum of obstruction in front of the resonator.

An additional object is to provide an improved acoustic generator wherein the fluid outlet port is centrally disposed relative to a concentric resonator and reversing deflector or wherein the fluid outlet port is concentrically disposed about the resonator and reversing deflector.

A further object is to provide an improved acoustic generator having a substantially straight through flow path for materials to be atomized.

These and other objects and advantages of the present invention will be pointed out with particularity or will be evident from the following description and the drawing appended thereto in which:

FIG. 1 is an elevational view in section of the present invention acoustic generator.

FIG. 2 is a view from below the acoustic generator of FIG. 1 taken along line 2—2.

FIG. 3 is a fragmentary elevational view in section illustrating the flow pattern of the acoustic generator of FIG. 1.

FIG. 4 is a view similar to FIG. 2 illustrating an alternative spray material nozzle having elongated slots.

FIG. 5 is a view similar to FIG. 2 illustrating another alternative spray nozzle having replaceable jet orifices.

FIG. 6 is a partial elevational view illustrating radial apertures comprising the spray material nozzle.

FIG. 7 is a partial elevational view in cross section illustrating a cylindrical spray material nozzle parallel to the longitudinal axis of the acoustic generator and the spray pattern created thereby.

FIG. 8 is a partial elevational view in cross section illustrating an outwardly flaring spray material nozzle and the spray pattern created thereby.

FIG. 9 shows schematically a source of molten metal.

FIG. 10 is a plan view of an alternative embodiment of the present invention; and FIG. 11 is a sectional elevation view taken along line 11—11 of FIG. 10 and illustrating a construction wherein the fluid outlet port is centrally disposed about the longitudinal axis of the acoustic generator and the resonator and reversing deflector are concentric thereabout.

Referring now to the drawing, and in particular to FIG. 1 and FIG. 2, there is shown an acoustic generator generally designated as 10. The generator is comprised of three main components, namely, a body portion 12 having an integral gas nozzle 14 and resonator 16 both coaxial and concentric thereto, a reverser valve 18 in axial spaced opposition to the gas nozzle and resonator, and finally a fluid nozzle 20, radially spaced from and coaxially surrounding the resonator.

Body portion 12 has at its upper end 22 a threaded inlet port 24 for the liquid material which is to be sprayed. Port 24 communicates directly with fluid nozzle 20 by means of passageway or duct 26 disposed longitudinally within body 12. An active gas duct 28 is formed concentrically with the longitudinal axis of the generator in the lower portion thereof, and at its upper end terminates in an inlet port 30 formed in the side wall of the generator. By definition, the active gas and liquid material flow "downstream" from inlet ports 30 and 24, respectively. This construction permits concentricity of the gas and fluid nozzles as well as the resonator and reversing deflector without unduly increasing the size of the apparatus. Body portion 12 is further characterized by a reduced diameter cylindrical portion 32 having a conical end 33 which, in conjunction with hollow gas nozzle 14, similarly conical, defines a fluid reservoir 34. The orifice 36 of reservoir 34 is radially spaced from and substantially covers resonator 16 formed near the lowermost end of body 12. Gas nozzle 14 is threadably secured to body 12 and has disposed therebetween a sealing gasket 38.

Resonator 16, in the form of an inclined annular channel, is comprised of an inner side wall 40 which, in the embodiment shown, starts at the bottom of body 12 adjacent gas nozzle 14 and extends upwardly and outwardly to terminate in an arcuate end wall 42. The outer side wall 44, a continuation of end wall 42, is in spaced parallel relation to inner side wall 40 but of somewhat shorter length, terminating slightly below the open orifice end 36 of fluid nozzle 20. In the particular embodiment illustrated in FIG. 1 and FIG. 2, wall 44 extends approximately 0.034 inch below the end of fluid nozzle 20 thereby leaving a small exposed portion of inner wall 40 while the end wall 42 is contained within the confines of fluid nozzle 20. Angle A, the inclination of resonator 16 with respect to the longitudinal axis of the generator, may be varied for different applications. In the illustrated embodiment, the angle is approximately 17°, thus producing an included cone angle for spray material of approximately 146°. By way of illustration, if angle A were increased to 20°, the included cone angle would be 140°. The annular gap of approximately 0.020 inch between the fluid material nozzle and the outside surface of the resonator forms the annular fluid orifice 36 adjacent the inclined resonator 16.

Reversing deflector 18 is comprised of an elongated stem 50 adjustably positioned at its upper end within body 12 by means of screw threads 52 and retained in a particular axial position by set screw 54. Deflector 18 is accurately centered on the longitudinal axis of the generator by means of spider 56 fitted into gas duct 28. The spider support assures accurate positioning of the reversing deflector while still permitting adequate flow of gas therethrough. By loosening set screw 54, deflector 18 may be threadably adjusted either closer to or farther away from both the resonator and the fluid orifice. This would have the effect of changing the size and shape of the constricted gas nozzle which is defined by the juxtaposition of the resonator and reversing deflector. For purposes of orientation, the reversing deflector is said to be downstream of the resonator. At its opposite end, deflector 18 is provided with a toroid 58 having a concave reflecting surface 60 spaced proximate to and in opposition with gas duct 28 of nozzle 14. Surface 60 of toroid 58 effectively reverses the flow of the incoming gas directing it upstream into resonator 16, from which it is again redirected outwardly to impinge on the downwardly flowing supply of fluid material. As seen in FIG. 3, the downward, outflow of fluid material surrounds the resonator and is formed into a spray cone during the discharge cycle of the resonator. It should be noted that since the resonator is formed directly in the body of the generator, it is of very rugged construction, capable of withstanding considerable shock. Further, since the resonator is frequently used inverted, that is, with the nozzles pointing down, there is little likelihood of an accumulation of fluid material collecting therein. This is of importance in that the reliability of the apparatus with respect to accuracy and repetition of operation is maintained due to the resonator being uncontaminated. In addition, the proximate location of all cooperating elements of the apparatus assures maximum utilization of sonic energy.

While the embodiment hereinabove described contains an annular orifice for the efflux of fluid material, it also contemplates providing alternative structures all having the common factor of downwardly dispensing a fluid material that is impinged upon by a reversely directed beam of sonic energy. One such structure is illustrated in FIG. 4 wherein fluid nozzle 20*a* is provided with elongated slots 62 in place of annular orifice 36. It is to be understood that the size and quantity of slots may be varied to meet the requirements of particular applications. In addition, the shape of the slots may be altered to include circular apertures. In FIG. 5 there is shown an alternative structure wherein jet nozzles 64 are secured in the lower face of fluid nozzle 20*b*. The advantages provided by the jet nozzles are that they may be selected from a range of sizes and be easily replaced if found to be defective. Orifice jets or jet nozzles provide individual filaments of liquid which at times have advantage for very viscous or corrosive fluids. In viscous applications, a thin filament is sometimes preferable to provide a sausage-like bead of uniform diameter. In corrosive applications, small openings are exposed to rapid wear and therefore the advantage of easily replacing the opening is obvious.

FIG. 6 illustrates a fluid nozzle 20*c* having a plurality of apertures 66 located so as to provide a radially outward flow of fluid material as opposed to the substantially axial flow of the previous embodiments. Radial ports, jets, or orifices, can be advantageous for producing very wide cones, such as shown, for use in gas cooling operations or for exceptionally viscous materials where the radial spray pattern prevents reagglomeration. In this embodiment, plug 67 closes the annular passage.

In the embodiment of FIG. 7, nozzle 20*d* provides a cylindrical curtain of fluid parallel to and concentric with the longitudinal axis of the generator. Whereas the prior embodiments were constructed with conical end portions on the body of the generator and the fluid nozzle, the embodiment of FIG. 7 has straight end portions that are concentric with one another and with the gas nozzle. This provides for adjustment of the nozzle in relation to the resonator whilst keeping the liquid flow constant. Some adjustment to the cone angle is possible by varying the length of the surrounding sleeve. In the embodiment shown, a narrow cone pattern is obtained. As before, the gas flow direction is reversed by means of a deflector.

There is shown in FIG. 8 still another embodiment of the present invention. Nozzle 20*e* is flared outwardly at the lowermost end portion thereof providing a medium bushy cone-shaped spray pattern. In flaring out the annular liquid orifice, a medium spray pattern is provided. If the liquid nozzle is adjusted it acts like a valve and could in the extreme shut off the liquid flow completely. The device of this invention may be used to spray liquid metal. In FIG. 9 there is shown schematically a metal melting means 90 connected to a nozzle 10.

FIG. 10 and FIG. 11 illustrate an embodiment of the present invention particularly well adapted to the atomization of extremely viscous materials or slurries with high solids and/or abrasive content. Acoustic generators employing the configuration herein described are designed to eliminate the problems of clogging and material build-up so often encountered. In this embodiment, the resonator and reversing deflector surround the liquid feed orifice which is downstream thereof and is completely unobstructed.

Acoustic generator 100 is comprised of a body portion 102 having external threads 104 at the upper end thereof. Threads 104 mate with internal threads on a gas supply source 106 shown in phantom in FIG. 11. Gas enters body portion through a plurality of inlet ports 108 equally spaced from each other on a common diametrical centerline. Bores 108 terminate in a common chamber 110 having an inwardly tapering wall, the lowermost portion of which defines a gas nozzle 112.

Body portion 102 is further provided at its lower end, with an annular resonator 114 having inclined walls 116. As in the previous embodiments, the resonator is wholly contained within the body portion in order to provide rigidity. It will also be seen that both the gas nozzle and the open end of the resonator terminate in approximately the same plane.

Combination reversing deflector and fluid inlet means 118 are centrally disposed on the longitudinal centerline of acoustic generator 100. Support means 118 is comprised of a hollow tube 120 having a substantially linear central bore 121 and external threads 122 at the upper end thereof. Threads 122 are adapted to engage similar threads on a fluid source 124 shown in phantom in FIG. 11. Another set of external threads 126 are provided on the central portion of tube 120 whereby the support tube may be adjustably secured in threaded central bore 128 of body member 102. A reversing deflector 130 having a concave reflecting surface 132 is integrally formed at the bottom end of tube 120 in spaced opposition to the gas nozzle 112 and the resonator 114. By this construction, the resonator, the gas nozzle and the reversing deflector, are concentrically and coaxially arranged about a central fluid orifice 134.

The embodiment described hereinabove is particularly useful with highly viscous fluids. Centralization of the fluid passage provides a smooth unobstructed flow. In addition, the construction of this embodiment permits the positioning of the fluid nozzle below the plane of the resonator and thus reduces the possibility of resonator contamination. The viscous fluid or slurry is directed axially, the gas is deflected outwardly, and the sonic energy is concentrated on the longitudinal center line of the acoustic generator whereby it may act on and atomize the fluid at a point below the fluid nozzle.

It should be understood that with each of the nozzle configurations enumerated hereinabove, any one of the orifice arrangements of the previous embodiments may be employed.

There has thus been set forth several variations of a reverse flow acoustic generator spray nozzle, each of which incorporates rugged construction, due in part to the resonator being substantially self-contained internally of the generator body. This configuration also provides a resonator inverted from the position of the prior art and thus assures more trouble-free and accurate performance. An additional advantage accures in that no additional reflecting surface is required since the resonator itself, in cooperation with the reversing deflector, is variable and either one or both elements may be altered in shape or position to meet the changing requirements of different applications.

There has been disclosed heretofore the best embodiments of the invention presently contemplated and it is to be understood that various changes and modifications may be made by those skilled in the art without departing from the spirit of the invention.

What is claimed is:

1. A liquid spraying apparatus employing an acoustic generator comprising:

(a) a body member including independent gas and liquid cavities in communication with gas and liquid inlet ports, respectively, the gas and liquid cavities being concentrically disposed with respect to each other;

(b) a gas dispensing outlet extending from said body member in a downstream direction, said gas dispensing outlet having a bore contiguous with the gas cavity;

(c) a gas flow reverser member rigidly supported from said body member in spaced relation to said gas dispensing outlet, said reverser member being provided with a concave upwardly facing annular groove in opposition to said gas dispensing outlet, the annular groove being nonresonant to the flow of gas therethrough;

(d) an annular cavity resonator deployed in said body member coaxial with said gas dispensing outlet; and (e) liquid nozzle orifice means carried by said body member, said liquid nozzle orifice means being deployed in concentric relationship to said cavity resonator and in communication with the liquid cavity.

2. The apparatus in accordance with claim 1 wherein said liquid cavity is a hollow tube centrally located within said body member, said cavity resonator and said flow reverser member being disposed concentrically thereabout.

3. The apparatus in accordance with claim 2 wherein said liquid nozzle orifice means is positioned downstream with respect to said cavity resonator and said flow reverser means.

4. The apparatus in accordance with claim 1 wherein the gas cavity is centrally located and said liquid nozzle orifice means is deployed concentrically about said resonator cavity and in communication with the liquid cavity.

5. The apparatus of claim 1 including means to vary the spacing between the said gas dispensing outlet and the said gas flow reverser member whereby the velocity of the gas leaving the reverser may be varied for a given gas input pressure.

6. The apparatus of claim 1 wherein said reversing means comprises a support member having screw thread axial adjustment means at one end and a toroidally shaped reversing deflector at the opposite end and wherein the interface between said support member and said toroid is concave.

7. The apparatus of claim 1 wherein said liquid nozzle orifice means is an annulus.

8. The apparatus of claim 1 wherein said liquid nozzle orifice means comprises a plurality of circumferentially placed apertures in communication with the liquid cavity and proximate to said resonator.

9. The apparatus of claim 1 wherein said liquid nozzle orifice means comprises a plurality of jet nozzles disposed in the end portion of said liquid nozzle proximate said resonator.

10. The apparatus of claim 1 wherein said liquid nozzle orifice means comprises a plurality of radial bores in communication with said liquid cavity proximate to said resonator.

11. The apparatus of claim 1 wherein said cavity resonator comprises an inner side wall, a radially spaced outer side wall parallel to and of shorter length than said inner side wall and an end wall connecting said inner and outer side walls, the lower end of said longer, inner side wall being positioned proximate to the annular groove of said reversing means to define a choked gas nozzle therebetween.

12. The apparatus of claim 11 wherein said open end of said resonator is closer to the longitudinal center line of said generator than is said end wall of said resonator.

13. The apparatus of claim 11 wherein said resonator side walls are parallel to the longitudinal center line of said resonator.

14. The apparatus of claim 11 wherein said open end of said resonator is farther away from the longitudinal center line of said generator than is said end wall of said resonator.

15. The apparatus of claim 1 including metal melting means in communication with the liquid inlet means.

References Cited by the Examiner

UNITED STATES PATENTS

| | | | |
|---|---|---|---|
| 2,519,619 | 8/1950 | Yellott et al. | 239—4 |
| 3,064,619 | 11/1962 | Fortman | 116—137 |
| 3,070,313 | 12/1962 | Fortman | 239—4 |
| 3,081,946 | 3/1963 | Soloff | 239—4 |

EVERETT W. KIRBY, *Primary Examiner.*